United States Patent [19]

Shipai et al.

[11] 4,301,352
[45] Nov. 17, 1981

[54] DEVICE FOR SURFACE FUSION TREATMENT OF ARTIFICIAL STONE PRODUCTS

[76] Inventors: Andrei K. Shipai, ulitsa Karbysheva, 7, kv. 157; Anatoly I. Zolotovsky, ulitsa Kalinovskogo, 33, kv. 16; Vladislav G. Moskovsky, ulitsa Sedykh, 58, kv. 30; Nikolai N. Naumenko, ulitsa Miroshnichenko, 9, kv. 391; Vladimir D. Shimanovich, Leninsky prospekt, 91, kv. 149; Leonid I. Kiselevsky, ulitsa Kulmana, 15, kv. 178, all of Minsk, U.S.S.R.

[21] Appl. No.: 84,725

[22] Filed: Oct. 15, 1979

[51] Int. Cl.³ .............................................. B23K 9/00
[52] U.S. Cl. .............................. 219/121 PR; 219/75; 219/123; 219/121 P; 219/121 PQ; 250/539; 250/540; 264/57; 425/445; 148/9.5
[58] Field of Search ................... 219/76.16, 121 P, 75, 219/123, 137 R; 264/56, 57, 80, 64; 250/531-535, 539, 540; 52/310; 425/445; 148/11.5 R, 9.5 R

[56] References Cited

U.S. PATENT DOCUMENTS

| | | | |
|---|---|---|---|
| 1,175,246 | 3/1916 | Doherty | 264/80 X |
| 1,862,066 | 6/1932 | Skillin | 264/80 X |
| 2,879,218 | 3/1959 | Stirnemann | 250/544 |
| 3,584,184 | 6/1971 | Tylko et al. | 219/137 R |
| 3,813,212 | 5/1974 | Shofner et al. | 264/80 |
| 3,900,538 | 8/1975 | Kawakami | 264/80 |
| 4,013,866 | 3/1977 | Fox et al. | 219/123 |

OTHER PUBLICATIONS

Observation of a Transition into a Stable Mode for an Arc Burning on a Rotating Anode, by Reeves-Saunders; Applied Physics, vol. 4, No. 8 (1971).

Primary Examiner—Gene Z. Rubinson
Assistant Examiner—Mark H. Paschall
Attorney, Agent, or Firm—Burton L. Lilling

[57] ABSTRACT

Disclosed is a device for surface fusion treatment of artificial stone products. The device comprises anode and cathode assemblies of a plasma generator forming an arc discharge along the plane of the surface to be treated, the anode and cathode assemblies being mounted separately. In the device, the anode and the cathode are made as round rods disposed to each other and rotating about their axes in opposite directions as viewed from the working zone. Arranged between the anode and the cathode is a screen having a gas-permeable bottom to feed a plasma gas therethrough to the working zone, thereby forcing the arc discharge against the surface being treated. The screen is mounted at right angles to the axes of the anode and the cathode and is movable along the axes by a reciprocating-motion drive, the arc discharge moving together with the screen.

16 Claims, 5 Drawing Figures

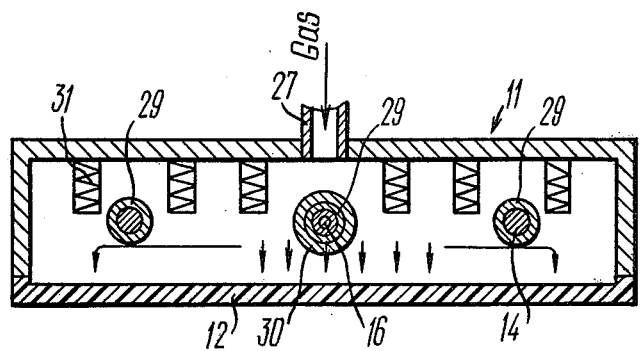
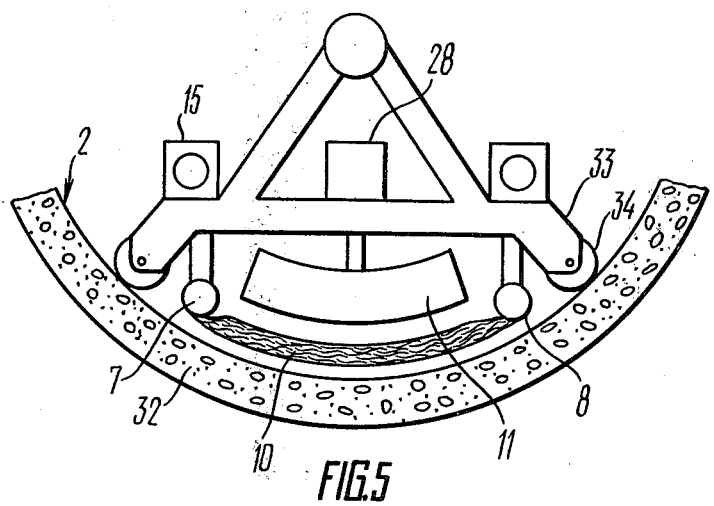

DEVICE FOR SURFACE FUSION TREATMENT OF ARTIFICIAL STONE PRODUCTS

FIELD OF THE INVENTION

The present invention relates to the treatment of products made of artificial stone materials such as ceramics, silicate, concrete and the like. More particularly, the invention relates to devices for surface fusion treatment of products made of artificial stone materials, used to produce a surface layer possessing decorative and protective properties.

The invention can be most advantageously used to treat products having a large surface area to be treated and requiring a relatively thin fused layer. Such products include in particular building panels and blocks, vessels for storing oil and other aggressive materials.

BACKGROUND OF THE INVENTION

Known in the prior art are devices for surface fusion treatment of products made of artificial stone materials, comprising an oxyacetylene burner or a plasma generator and a mechanism for relative displacement of the burner or generator and the product (cf. USSR Author's Certificate No. 339421 and the Hungary Pat. No. 172 563). As the surface layer is fused by such devices the burner flame or the plasma jet is directed to the surface being treated. In so doing, the surface layer fusion takes place within the contact spot of the burner flame or the plasma jet and the surface being treated, and therefore, the productivity of said devices provided with a single burner or generator is relatively low. The use of a plurality of oxyacetylene burners or plasma generators in a single device complicates the design and reduces the reliability of such a device.

Also known in the art are devices for surface fusion treatment of products made of artificial stone materials, and producing an arc discharge of a plasma generator along the surface being treated, thus enhancing the treatment productivity as compared to that of the devices described hereinabove. A device is known which comprises separately mounted anode and cathode assemblies of a plasma generator, directs the arc discharge transversely to the longitudinal axis of an anode shaped as an elongated body, and displaces the arc discharge along this axis (cf. U.S. Pat. No. 3,584,184). In the device in question, the anode is made as a rectangular box while the cathode is made as a pin installed so as to be directed towards the anode at an acute angle to the plane of arrangement of the surface being treated on the working zone side. The anode is fixed, while the cathode is movable along the anode and is coupled with a mechanism providing reciprocating motion thereof in that direction. When the surface of the product is treated, the product is moved from the cathode towards the anode as sequential sections of the surface have been treated with the cathode being moved in one direction.

In the described prior art device having the discussed arrangement of the cathode, the arc discharge occurs along a curved line through a surface layer of the product being treated. This is necessary to provide, using the electric conductivity of the fused material, a deep fusion of the product being treated. However, when a relatively thin surface layer is fused by a convective and radiative heat exchange between the surface being treated and the arc discharge, the arc discharge will work effectively only with a portion of the length thereof, which reduces the width of the surface section being treated and leads to considerable plasma heat energy losses. At the same time the effective fusion of surface layer cannot be achieved with the use of the described prior art device, since the arrangement of the cathode in parallel with the surface does not permit the use of the entire length of the arc discharge as required to treat large surfaces having dimensions, in the direction of both axes at right angles to each other, that are longer than the spacing between the cathode and the anode. This is caused by the fact that in the described device the arc discharge passes through the cathode axis, and, therefore, with consideration for the transverse dimensions of the anode and cathode assemblies, the arc discharge is far removed from the surface being treated.

SUMMARY OF THE INVENTION

It is an object of the present invention to provide a device for surface fusion treatment of artificial stone products, which improves the productivity of large surface treatment, as compared to the prior art devices, by the use of the convenctive and radiative heat exchange between the arc discharge and the surface being treated.

Another object of the present invention is to provide high efficiency of the device mentioned above.

Still another object of the present invention is to provide a device reliable in operation.

With these and other objects in view there is proposed a device for surface fusion treatment of artificial stone products, comprising separately mounted anode and cathode assemblies of a plasma generator directing an arc discharge at right angles to the longitudinal axis of the anode shaped as an elongated body, and displacing the arc discharge along this axis. According to the invention, the anode and the cathode are made as round rods arranged parallel to each other and are rotatable about their axes in opposite directions as viewed from the working zone side by a drive. Between the anode and the cathode a hollow screen is mounted normal to their axes. The screen has a gas-permeable bottom to supply a plasma gas therethrough and facing the working zone. The screen is formed as an elongated body with a width slightly exceeding the diameter of an arc discharge, and transversely displaceable by a drive associated therewith.

Such an embodiment provides for creation of a plasma arc discharge between points on the anode and cathode circumferences in close proximity to the surface being treated along the entire length of the arc discharge. The screen contributes additional forcing of the arc to the surface and its reliable holding near the surface being treated. For this reason, the device, according to the present invention, allows one to fuse the surface layer along a section of the surface, having a width equal to the length of the plasma arc discharge, which results in a higher productivity of such a device as compared to the prior art devices and in high efficiency of the device. The efficiency is also increased due to the screen reducing the heat dissipation into the surrounding space and ensuring multiple reflection of the radiated heat energy between the screen and the surface being treated.

It is advisable that the anode and cathode assemblies and the screen of the device be installed on a movable carriage capable of displacement at right angles with respect to the anode and cathode axes. After the treatment of one of the surface sections disposed between the anode and the cathode, the device according to such an embodiment of the invention can be quickly moved to treat an adjacent section.

The screen bottom is preferably made of a porous material providing uniform supply of the plasma-forming gas into the working zone.

According to any embodiment of the invention, the screen may be fitted with electromagnets uniformly distributed along the entire length thereof and generating a magnetic field whose lines of magnetic force are directed towards the working zone to additionally press the arc discharge against the surface being treated.

Furthermore, according to any embodiment of the invention, the screen may be bent in a plane normal to the anode and cathode axes to follow the shape of the surface being treated. This facilitates the treatment of curvilinear surfaces formed by a rectilinear generatrix, in particular cylindrical surfaces.

BRIEF DESCRIPTION OF THE DRAWINGS

These and other objects and advantages of the present invention will become fully apparent from the following description taken in conjunction with the accompanying drawings, wherein:

FIG. 4 is a sectional view of a screen, taken along the line IV—IV of FIG. 2; and FIG. 5 is a front elevational view of a device for surface fusion treatment of the internal surface of concrete vessel walls, according to the invention.

DETAILED DESCRIPTION OF THE INVENTION

Figure 1:
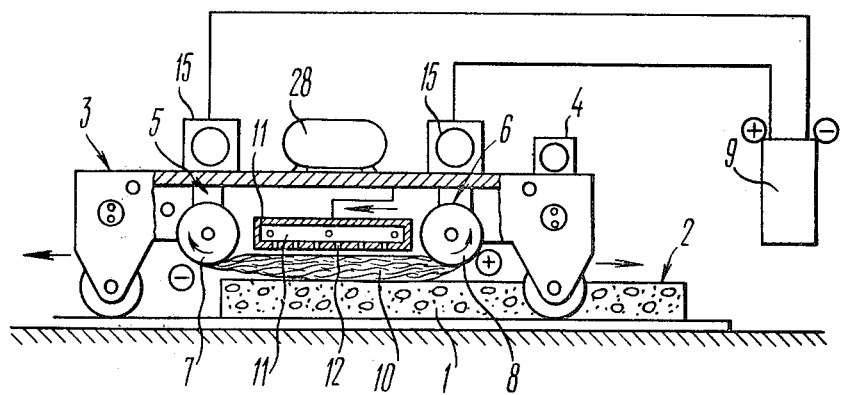
FIG. 1 is a front elevational view of a device for surface fusion treatment of building slabs made of artificial stone materials, according to the invention.

Referring now to the accompanying drawings and initially to FIG. 1, the proposed device is intended for surface fusion treatment of building slabs 1 made of artificial stone materials, i.e. concrete, and having dimensions of a surface 2 to be treated, in the direction of both axes at right angles to each other, that exceed the length of a plasma generator arc discharge.

The device comprises a movable carriage 3 driven by a reversible electric motor 4 and on which an anode assembly 5 and a cathode assembly 6 of a plasma generator are mounted. The assemblies are mounted separately and comprise respectively an anode 7 and a cathode 8, both of which being connected to a voltage source 9. The anode 7 and the cathode 8 are made as round rods, and an arc discharge 10 is created between them in a direction normal to the axes thereof. The displacement of the movable carriage 3 is effected in the same direction.

Disposed between the anode 7 and the cathode 8 at right angles to their axes is a screen 11 having a gas-permeable bottom 12 facing the working zone. The screen 11 is made as an elongated body having a width slightly exceeding the diameter of the arc discharge 10 of the plasma generator.

Figure 2:
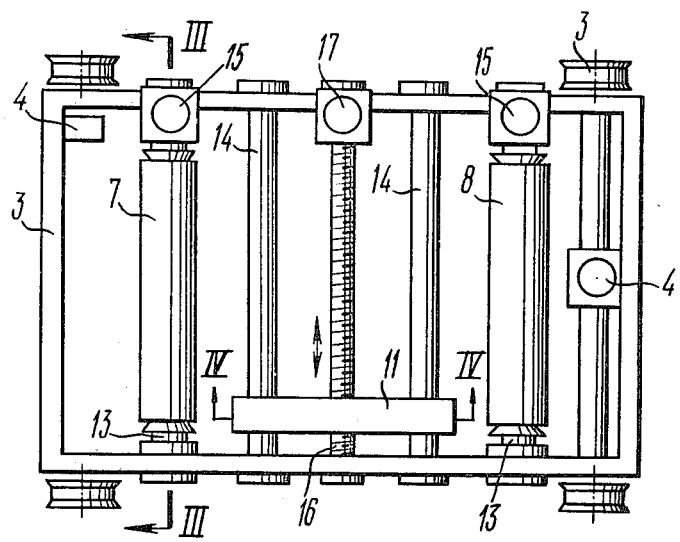
FIG. 2 is a bottom view of the device shown in FIG. 1.

Referring now to FIG. 2, the anode 7 and the cathode 8 are arranged parallel to each other and are fixed in end bearings 13. The screen 11 is movable along guide rods 14 and transversely movable with respect to the axes of the anode 7 and the cathode 8. The anode 7 and the cathode 8 are operatively associated with a driving electric motor 15 (FIG. 1) used to rotate them about their axes in opposite directions as viewed from the working zone side. The screen 11 is operatively associated via a lead screw 16 and speed reducer with a reversible electric motor 17 providing a reciprocating motion of the screen 11 along the guide rods 14.

Figure 3:
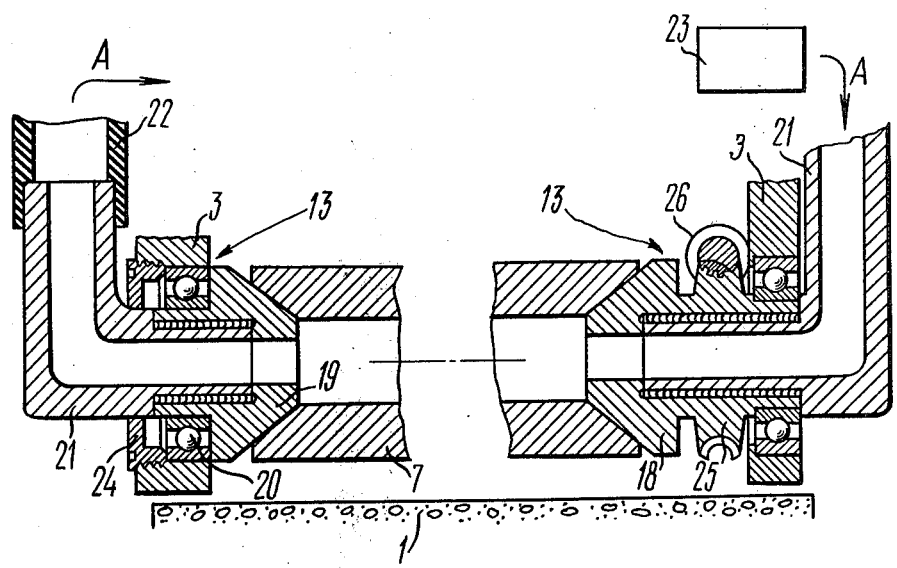
FIG. 3 is an enlarged cross sectional view of an anode assembly, taken aong the anode axis III—III of FIG. 2.

The anode assembly is illustrated more clearly in FIG. 3 and shows that the anode 7 is made hollow. The end bearings 13 of the anode 7 comprise clamping cones 18 and 19 provided with central longitudinal passages communicating with the interior of the anode 7. The cones 18 and 19 are fixed in bearings 20 of the movable carriage 3. The passages of the cones 18 and 19 on the side opposite to the anode 7 are provided with pipe connections 21 having circumferential sealing. Hoses 22 interconnect the pipe connections 21 and a unit 23 used to cool a cooling liquid and to circulate it through the hoses 22 and the interiors of the anode 7 and the cathode 8. The cone 19 together with the bearing 20 is pressed against the end face of the anode 7 by means of a locking ring 24 provided with an exterior thread. In order to remove the anode 7 and to replace it, the ring 24 should be screwed off and the cone 19 should be displaced together with the bearing 20. The cone 18 is provided with a toothing 25 engaged with gears of a speed reducer 26 coupled with the driving electric motor 15.

The design of the cathode assembly 6 is similar to that of the anode assembly 5.

Referring now to FIG. 4 showing the design of the screen 11, the screen 11 is made as a hermetically sealed chamber provided with pipe connections 27 connected to a gas source 28 (FIG. 1). The gas-permeable bottom 12 of the screen 11 is made of a porous refractory material, for example, titanium sponge. The walls of the screen 11 have sleeves 29 (FIG. 4) with sealing members, the rods 14 passing through the sealing members. In the walls of the screen 11 there are nuts 30 engaged with the lead screw 16. Electromagnets 31 producing a magnetic field with lines of magnetic force directed towards the working zone are uniformly distributed inside the screen 11 along the length thereof.

Shown in FIG. 5 is a device for surface fusion treatment of the internal surface 2 of the walls of concrete vessels 32. In this device, the anode 7 and the cathode 8 are arranged vertically on a movable carriage 33 having, in this embodiment, auxiliary bearing wheels 34 rotatable in a horizontal plane to bear against the internal surface 2 of the wall of the concrete vessel 32.

In this embodiment, the screen 11 is bent in a plane at right angles to the axes of the anode 7 and the cathode 8 and has same radius as the internal surface 2 of the wall of the concrete vessel 32.

The devices described hereinabove operate in a similar manner.

The movable carriage 3 or 32 is placed at the section of the surface 2 to be treated, and the driving electric motors 15 are switched on to rotate the anode 7 and the cathode 8. Then the gas is supplied from the source 28 into the interior of the screen 11, and the voltage is applied from the voltage source 9 to the anode 7 and the cathode 8 to create the arc discharge 10 formed as a plasma cord in the medium of the plasma gas supplied through the porous bottom 12 of the screen 11 into the working zone. The arc discharge 10 is pressed against the surface 2 to be treated along the entire length under the influence of the plasma gas pressure. When switched on, the electromagnets 31 of the screen 11 produce a magnetic field additionally forcing the arc discharge 10 against the surface 2. The electric motor 17 is then switched on to displace the screen 11 along the axes of the anode 7 and the cathode 8 by means of the speed reducer and the lead screw 16. As the screen 11 is displaced, the arc discharge 10 in the form of a plasma cord is also displaced together therewith and provides a convective and radiative fusion of a surface layer having a width equal to the spacing between the axes of the anode 7 and the cathode 8 and a length equal to the length of the anode 7 and the cathode 8. Following the treatment of such a section, the device is displaced to the next position to treat an adjacent section.

As follows from the aforesaid and the appended drawings, the device in accordance with the present invention forms the arc discharge 10 parallel to the surface 2 and in the immediate vicinity thereto. This enables the treatment of a surface 2 having a width equal to the length of the arc discharge 10, thus providing a high productivity of the device with the use of the convective and radiative heat exchange between the arc discharge 10 and the surface 2. Owing to this, surfaces of an unlimited area can be treated.

The utilization of the entire length of the arc discharge 10 and of the screen 11 reducing the heat dissipation and providing a multiple reflection of the heat radiation between the surface 2 and the bottom 12 insures high efficiency of the device according to the present invention.

The forced pressing of the arc discharge 10 against the surface 2 provides for treating of relief surfaces with a decorative ornament.

The rotation of the anode 7 and the cathode 8 and the use of the screen 11 contributes to reduction of a ripple of the arc discharge 10 and improves the spatial stability thereof. Furthermore, the rotation of the anode 7 and the cathode 8 and the reciprocating motion of the arc discharge 10 together with the screen 11 lead to uniform wear of the working surfaces of the anode 7 and the cathode 8, thus increasing the service life thereof. All this, in combination, provides high reliability of the proposed device.

While particular embodiments of the invention have been shown and described, various modifications thereof will be apparent to those skilled in the art. It is obvious that any other drives could be employed to rotate the anode and the cathode and to displace the screen and the carriages; other guide rods could be used for screen displacement; and other means could be used to secure the anode and the cathode. The screen could be provided with water cooling and a perforated bottom. It might be advisable to make the device stationary and to feed the product into the working zone. Should surfaces of cylindrical vessels be treated, the movable carriage could be installed on a rotatable beam associated with a drive used to rotate it. The device according to the invention is especially suited to treat walls of buildings and installations. In this case the embodiment of the movable carriage and the drive thereof will also differ from those disclosed as examples. Therefore it is not intended that the invention be limited to the disclosed embodiments or to the details thereof and that departures may be made therefrom within the spirit and scope of the invention as defined in the claims.

What is claimed is:

1. A device for surface fusion treatment of artificial stone products, comprising:

anode and cathode assemblies of a plasma generator mounted separately and creating an arc discharge along the plane of a surface to be treated, an anode and a cathode of said anode and said cathode assemblies each being made as a round rod and arranged parallel to each other, the arc discharge being created in a direction normal to the axes of said anode and said cathode;

bearings supporting said anode and said cathode assemblies, and in which the ends of said anode and cathode are axially fixed;

drives rotating said anode and said cathode about their axes in opposite directions as viewed from the working zone side;

a screen made as a hermetically sealed chamber, shaped as an elongated body whose width slightly exceeds the diameter of said arc discharge, and having a gas-permeable bottom to supply a plasma gas therethrough from the interior of said chamber, said screen being arranged between said anode and said cathode at right angles to the axes of said anode and said cathode so that said bottom of said screen is facing said working zone;

guides supporting said screen and disposed parallel to the axes of said anode and said cathode; and a drive effecting reciprocating displacement of said screen, thereby providing displacement of said arc discharge along the axes of said anode and said cathode.

2. A device according to claim 1, further comprising a movable carriage supporting said anode and cathode assemblies, said screen, and said drives providing rotation of said anode and said cathode and reciprocating displacement of said screen.

3. A device according to claim 1, wherein said bottom of said screen is made of a porous material.

4. A device according to claim 2, wherein said bottom of said screen is made of a porous materials.

5. A device according to claim 1, wherein said screen comprises electromagnets uniformly distributed along the length of said screen and producing an electromagnetic field with lines of magnetic force directed towards the working zone.

6. A device according to claim 2, wherein said screen comprises electromagnets uniformly distributed along the length of said screen and producing an electromagnetic field with lines of magnetic force directed towards the working zone.

7. A device according to claim 3, wherein said screen comprises electromagnets uniformly distributed along the length of said screen and producing an electromagnetic field with lines of magnetic force directed towards the working zone.

8. A device according to claim 4, wherein said screen comprises electromagnets uniformly distributed along the length of said screen and producing an electromagnetic field with lines of magnetic force directed towards the working zone.

9. A device according to claim 1, wherein said screen is bent in a plane normal to the axes of said anode and said cathode to follow the shape of a product being treated.

10. A device according to claim 2, wherein said screen is bent in a plane normal to the axes of said anode and said cathode to follow the shape of a product being treated.

11. A device according to claim 3, wherein said screen is bent in a plane normal to the axes of said anode and said cathode to follow the shape of a product being treated.

12. A device according to claim 4, wherein said screen is bent in a plane normal to the axes of said anode and said cathode to follow the shape of a product being treated.

13. A device according to claim 5, wherein said screen is bent in a plane normal to the axes of said anode and said cathode to follow the shape of a product being treated.

14. A device according to claim 6, wherein said screen is bent in a plane normal to the axes of said anode and said cathode to follow the shape of a product being treated.

15. A device according to claim 7, wherein said screen is bent in a plane normal to the axes of said anode and said cathode to follow the shape of a product being treated.

16. A device according to claim 8, wherein said screen is bent in a plane normal to the axes of said anode and said cathode to follow the shape of a product being treated.

* * * * *